United States Patent
Ito

(10) Patent No.: US 8,908,202 B2
(45) Date of Patent: Dec. 9, 2014

(54) IMAGE RECORDING DEVICE AND COMPUTER ACCESSIBLE STORAGE STORING PROGRAM THEREFOR

(75) Inventor: Koji Ito, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/338,660

(22) Filed: Dec. 28, 2011

(65) Prior Publication Data

US 2012/0162693 A1 Jun. 28, 2012

(30) Foreign Application Priority Data

Dec. 28, 2010 (JP) ................. 2010-293416

(51) Int. Cl.
*G06K 15/00* (2006.01)
*G06F 3/12* (2006.01)

(52) U.S. Cl.
USPC .............. 358/1.14; 358/1.13; 358/1.25

(58) Field of Classification Search
CPC .......... G06K 15/02; G06K 15/00; G06K 5/00
See application file for complete search history.

(56) References Cited

U.S. PATENT DOCUMENTS

| 8,089,645 B2 | 1/2012 | Soda | |
|---|---|---|---|
| 2006/0283939 A1* | 12/2006 | Hwang | 235/382 |
| 2008/0297837 A1* | 12/2008 | Soda | 358/1.15 |

FOREIGN PATENT DOCUMENTS

| JP | 2000-305743 | 11/2000 |
|---|---|---|
| JP | 2002-335357 | 11/2002 |
| JP | 2006-341496 | 12/2006 |
| JP | 2008-300914 | 12/2008 |
| JP | 2009-061634 A | 3/2009 |

OTHER PUBLICATIONS

Notification of Reasons for Rejection dated Mar. 12, 2013 received from the Japanese Patent Office from related Japanese Application No. 2010-293416, together with an English-language translation.

* cited by examiner

*Primary Examiner* — Fred Guillermety
*Assistant Examiner* — Henok A Shiferaw
(74) *Attorney, Agent, or Firm* — Scully, Scott, Murphy & Presser, P.C.

(57) ABSTRACT

An image recording device is provided with a first memory which is a volatile memory, a second memory, an input unit through which authentication information is input, an authentication judging unit. The recording unit is controlled to print an image on the printing sheet based on the drive data, which is converted from the image data stored in the first memory or the second memory and is stored in the first memory or the second memory. The drive data or the image data is stored in each of the first memory and the second memory is transmitted therebetween. The image recording device further includes a restricting unit capable of restricting power supply to the converting unit and the first memory in a sleep mode.

21 Claims, 4 Drawing Sheets

IMAGE RECORDING DEVICE AND COMPUTER ACCESSIBLE STORAGE STORING PROGRAM THEREFOR

CROSS-REFERENCE TO RELATED APPLICATION

This application claims priority under 35 U.S.C. §119 from Japanese Patent Application No. 2010-293416 filed on Dec. 28, 2010. The entire subject matter of the application is incorporated herein by reference.

BACKGROUND

1. Technical Field

Aspects of the invention relate to an image recording device configured to record image (image data) in a recording medium, and a computer accessible storage that stores a program for the recording device.

2. Related Art

There is known a printer which is configured, to improve security of a printed matter, such that the printer requires a user to execute an authentication procedure before printing, after the user has transmitted image data from a terminal to the printer.

SUMMARY

Such a printer typically employs a removable memory as a work memory. In view of improving the security, a volatile memory is typically used as the work memory. If the work memory is removed from the printer and power supply to the work memory is terminated, image data stored therein is deleted. However, when the working memory is the volatile memory, an operation mode of the printer cannot be set to a sleep mode, in which the power supply to a processing system including the work memory is stopped. If the power is stopped, the image data stored in the work memory is deleted. Therefore, such a configuration (i.e., employing the volatile memory as the work memory) makes it difficult to realize power saving.

In consideration of the above, aspects of the invention provide an improved image recording device and a computer accessible storage storing a program therefor, with which a power saving can be achieved.

According to aspects of the invention, there is provided 1. An image recording device, which is provided with an image recoding unit configured to print an image on a printing sheet, a receiving unit configured to receive image data which is externally transmitted, a converting unit configured to convert the image data received by the receiving unit to drive data used to drive the image recoding unit, a first memory configured to be a volatile memory storing one of the drive data and the image data, an input unit configured such that authentication information related to one of the image data and the drive data is input through the input unit, an authentication judging unit configured to judge whether the authentication information input through the input unit contains predetermined information, a restricting unit configured to restrict power supply to the converting unit and the first memory, a second memory configured to store one of the drive data and the image data, a transmitting unit configured to transmit the drive data and the image data between the first memory and the second memory, and a control unit configured to control the transmitting unit so that one of the drive data and the image data are stored in each of the first memory and the second memory, and control the recording unit to print an image on the printing sheet based on one of the drive data stored in one of the first memory and the second memory, and the drive data converted, by the converting unit, from the image data stored in one of the first memory and the second memory.

According to further aspects of the invention, there is provided a computer accessible storage storing a program containing computer executable instructions, when executed, to control an image recording device. The image recording device is provided with an image recoding unit configured to print an image on a printing sheet, a receiving unit configured to receive image data which is externally transmitted, a converting unit configured to convert the image data received by the receiving unit to drive data used to drive the image recoding unit, a first memory configured to be a volatile memory storing one of the drive data and the image data, an input unit configured such that authentication information related to one of the image data and the drive data is input through the input unit, an authentication judging unit configured to judge whether the authentication information input through the input unit contains predetermined information, a restricting unit configured to restrict power supply to the converting unit and the first memory, and a second memory configured to store one of the drive data and the image data, a transmitting unit configured to transmit the drive data and the image data between the first memory and the second memory. The instructions cause a computer to control the transmitting unit so that one of the drive data and the image data are stored in each of the first memory and the second memory, and control the recording unit to print an image on the printing sheet based on one of the drive data stored in one of the first memory and the second memory, and the drive data converted, by the converting unit, from the image data stored in one of the first memory and the second memory.

According to the above configuration, even if the power supply to the first memory and converting unit is stopped and the drive data or the image data stored in the first memory is deleted before the authentication is done, the image data or the drive data is maintained in the second memory. Therefore, after the restriction of power supply is released (i.e., the power is supplied to the converting unit and the first memory), the image can be printed using the data stored in the second memory. Therefore, according to the above configuration, both the high security and the power-saved performance are realized.

According to further aspects of the invention, there is provided an image recording device, which includes an image recoding unit configured to print an image on a printing sheet, a receiving unit configured to receive image data which is transmitted from an external device to the image recording device, a main memory configured to store the image data received by the receiving unit, a work memory configured to be a volatile memory, a data transmitting unit configured to transmit the image data stored in the main memory to the work memory, a converting unit configured to convert the image data stored in the work memory to drive data which is used to drive the image recoding unit, the drive data being stored in the work memory, an input unit configured such that authentication information related to one of the image data and the drive data is input through the input unit, an authentication judging unit configured to judge whether the authentication information input through the input unit contains predetermined information, a print control unit configured to control the recording unit to print an image on the printing sheet based on the drive data stored in the work memory, and a restricting unit configured to restrict power supply at least to the work memory if a predetermined condition is satisfied.

BRIEF DESCRIPTION OF THE ACCOMPANYING DRAWINGS

FIG. 1 schematically shows a configuration of a network system including an inkjet printer according to an embodiment of the invention.

DETAILED DESCRIPTION

Hereinafter, an inkjet printer 1 according to aspects of the present invention will be described with reference to the accompanying drawings.

Figure 1:
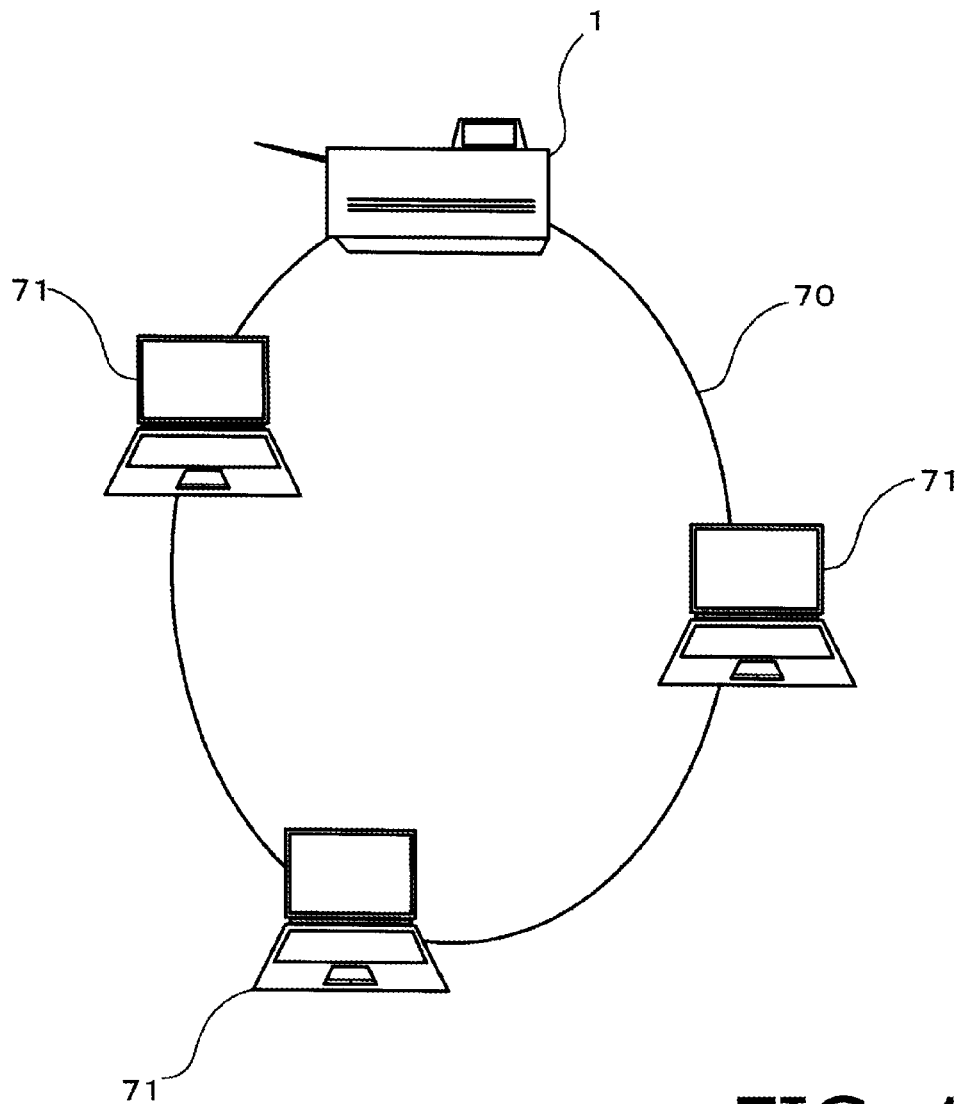

The inkjet printer 1 is a shared printer which is connected with a LAN (local area network) 70, to which a plurality of client terminals 71 are also connected (see FIG. 1). Each of the users of the client terminals 71 can send a print command to print out image data from the client terminal 71 to the inkjet printer 1 through the LAN 70.

Figure 2:
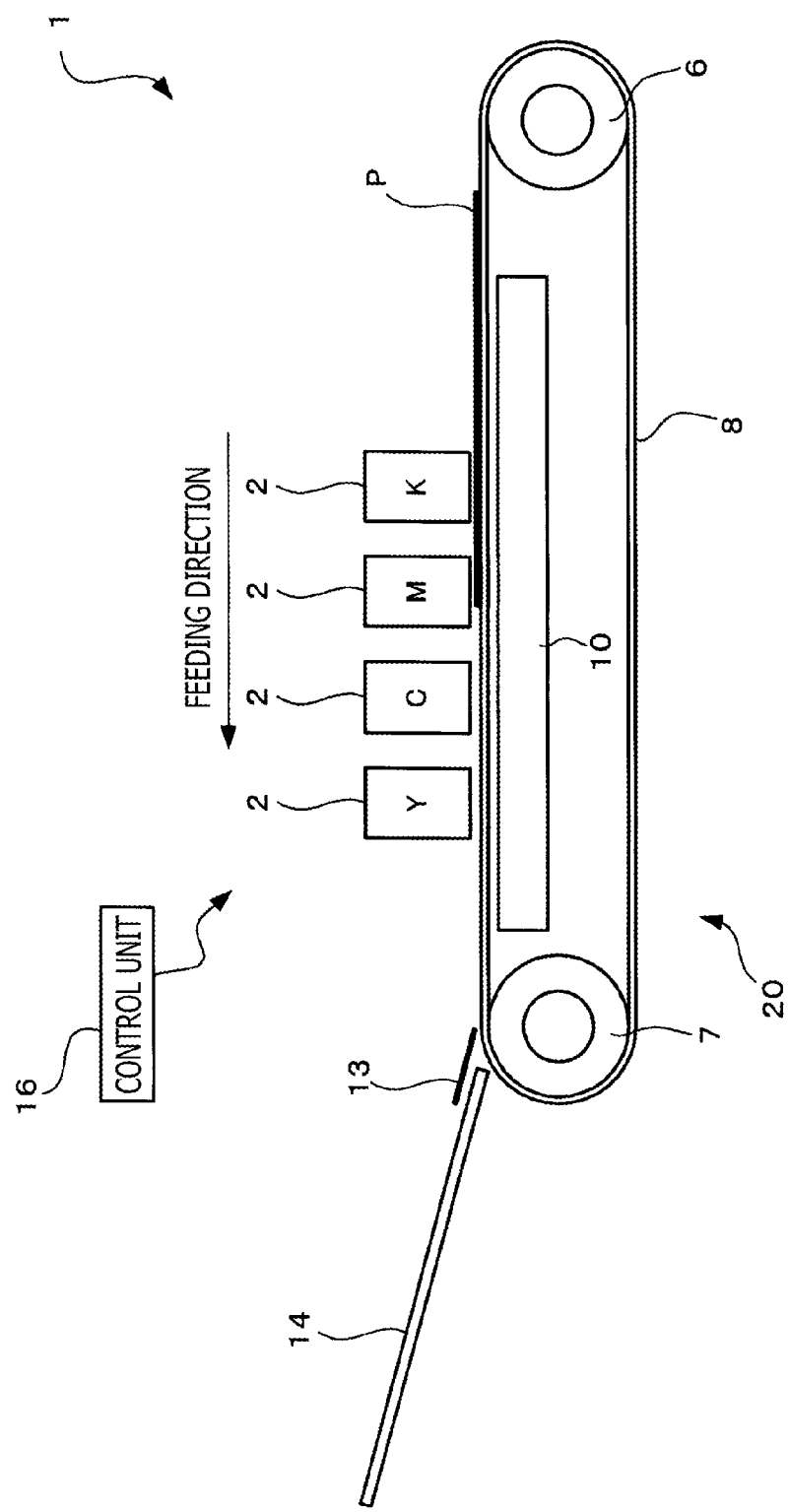
FIG. 2 is schematic side view of the inkjet printer show in FIG. 1.

As shown in FIG. 2, the inkjet printer 1 is provided with a feeding unit 20, four inkjet heads 2, a feeding mechanism 20 and a control unit 16. On a printing sheet P fed by the feeding unit 20, four colors of ink (black, magenta, cyan and yellow) are ejected to form a color image.

The feeding unit 20 is configured to rotate belt rollers 6 and 7 so that the feed belt 8 is driven to move and the printing sheet P placed on the feed belt 8 is fed along a path defined between the four inkjet heads 2 and a platen 10. While the printing sheet P is fed, ink drops are ejected onto the printing sheet P so that a desired color image is formed on the printing sheet P.

Figure 3:
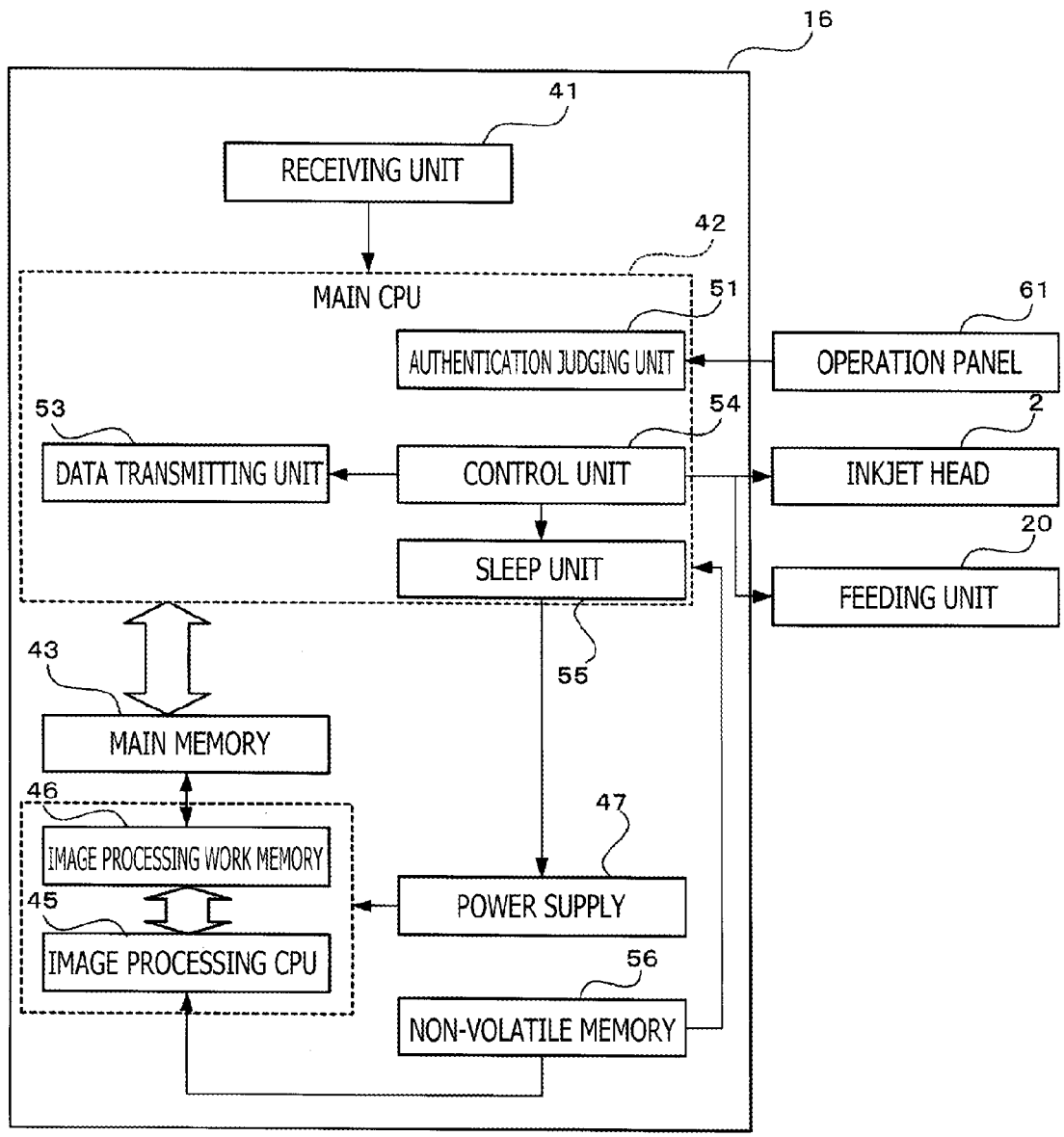
FIG. 3 is a functional block diagram illustrating a functional configuration of the printer shown in FIG. 1.

The inkjet printer 1 has an operation panel 61, which is provided with a touch panel display (see FIG. 3).

The control unit 16 is provided with a receiving unit 41, a main CPU (central processing unit) 42, a main memory 43, an image processing CPU 45, an image processing work memory 46 and a power source 47. Programs to be executed by the main CPU 42 and the image processing CPU 45 are stored in a non-volatile memory 56.

The programs may be originally stored in a flexible disk, a CD-ROM, a memory card or the like and are installed in the non-volatile memory 56. The originally stored programs may be ones executable by the main CPU 42 or the image processing CPU 45, or may be ones which can be executable only after installation in the non-volatile memory 56. Optionally, the originally stored programs may be encrypted and/or compressed.

The receiving unit 41 receives print commands from the client terminals 71 through the LAN 70. The print command contains data representing a print mode, and image data representing image formed on the printing sheet P. According to the embodiment, the print mode includes a secure print mode and a normal print mode. The secure print mode is a mode in which the printer does not start printing until the user who has transmitted the print command to the printer 1 inputs, through the operation unit 61, authentication information. According to the secure print, the printer 1 prints out the image under surveillance of the user. Therefore, security regarding the printed sheet P is increased. The normal printing mode is a mode in which the printer 1 immediately starts printing upon receipt of the print command from the client terminal 71.

The main CPU 42 is a general purpose CPU and operates to control an entire operation of the inkjet printer 1. The main memory 43 is a kind of volatile memories such as a DRAM (dynamic random access memory) and connected with the main CPU 42 via data bus. The main memory 43 functions as a work memory for the main CPU 42.

The image processing CPU 45 is a CPU dedicated to image processing. Specifically, the image processing CPU 45 converts the image data representing the image to be printed on the printing sheet P to drive data to drive the inkjet heads 2. The image processing work memory 46 is a DRAM connected with the image processing CPU 45 through a high-speed data bus.

The drive data converted from the image data by the image processing CPU 45 is stored in the image processing memory 46. It should be noted that, since the image processing is executed by the image processing CPU 45 in association with the image processing work memory 46, separately from the man CPU 42 and the main memory 43, the main CPU 42 exclusively occupies the main memory 43 and thus operates efficiently.

The drive data represents amount of each color ink to be ejected from the inkjet heads 2 for a unit area of the printing sheet P. The drive data is converted from the image data (e.g., data described in page description language PDL) in accordance with a well-known error diffusion process. If the printer is a laser beam printer, the drive data (i.e., the drive data for driving the laser beam recording unit) is converted from the image data (e.g., PDL data) in accordance with a well-known dithering process.

The drive data may include data used for controlling (driving) the printing unit 66 in addition to the amount data (i.e., a so-called print data representing the ink amount and/or thickness values) for a unit area of the printing sheet P.

The power unit 47 supplies a predetermined voltage (e.g., 3.3 volts) to the main CPU 42, the main memory 43, the image processing CPU 45 and the image processing work memory 46 based on an external power supply.

If a sleep unit 55 outputs a sleep mode start signal, the power unit 47 stops supplying the power to the image processing CPU 45 and the image processing work memory 46. It is noted that, since the image processing CPU 45 and the image processing work memory 46 co-operate, the power supply to both the image processing CPU 45 and the image processing work memory 46 is stopped. In the sleep mode, it is necessary to respond to an external communication or a user's operation of the operation unit 61, the power supply to the main CPU 42 and the main memory 43 is not restricted.

When the sleep unit 55 stops outputting the sleep mode start signal to terminate the sleep mode, the power unit 47 supplies the power to the image processing CPU 45 and the image processing work memory 46.

Typically, in order that the image processing can be executed faster, a CPU of which an processing speed is higher than the main CPU 42 is used for the image processing CPU 42. As a result, power consumption of the image processing CPU 45 is greater than that of the main CPU 42. Further, typically, the image processing work memory 46 is accessed by the image processing CPU 45 more frequently than the main memory 43 which is accessed by the main CPU 42. Therefore, by operating in the sleep mode in which the power consumption by the image processing CPU 45 and by the image processing work memory 46 is completely stopped, the power consumption can be reduced efficiently.

The main CPU 42, in association with the main memory 43, functions as an authentication judging unit 51, a data conversion unit 52, a data transmitting unit 53, a control unit 43 and a sleep unit 55.

The authentication judging unit 51 judges, when the receiving unit 41 receives the print command, whether the received print command represents the secure print or the normal print. Generally, the judgment is made based in identification data, which is data representing the print mode, contained in the print command, or the format of the image data contained in the print command.

If the authentication judging unit 51 judges that the print command represents the secure printing, the authentication judging unit 51 further judges whether authentication information input by the user through the operation panel 61 contains predetermined information. Typically, the predetermined information is a password coinciding with a password contained in the print command, or user information coinciding with the user information stored in the printer. It should be noted that the input of the authentication information may be done by reading information printed on a card or the like with an image reading device connected to the inkjet printer 1 instead of the user's input through the operation panel 61.

The data transmitting unit 53 executes data transmission between the main memory 43 and the image processing work memory 46. The data transmitting unit is further configured to store the image data contained in the print data received by the receiving unit 41 in the main memory 43, and further stores the image data in the image processing work memory 46. Thereafter, the image data stored in the image processing work memory 46 is converted into the drive data by the image processing CPU 45. As above, the image data, which was received before the user authentication is done, is converted into the drive data for the inkjet printer 2, it becomes possible that the printing operation can be started quickly upon the user authentication has been finished.

When the sleep mode is started, the power supplied to the image processing work memory 46 is stopped, therefore the drive data stored in the image processing work memory 46 is deleted. According to the embodiment, when the sleep mode is released later, the data transmitting unit 53 transmits the image data stored in the main memory 43 to the image processing work memory 46. Then, the image data stored in the image processing work memory 46 is converted into the drive data by the image processing CPU 45. With above process, the drive data is restored in the image processing work memory 46.

The sleep unit 55 determines to start the sleep mode when a predetermined period has passed after the user operation to the inkjet printer 1 or the data transmission to the inkjet printer 1 was executed last time. When the sleep unit 55 determines to start the sleep mode, it outputs the sleep start signal to the power unit 47. Further, when the user operation to the inkjet printer 1 or when data is transmitted to the inkjet printer 1 during the sleep mode, the sleep unit 55 determines to stop the sleep mode, and outputs a sleep stop signal to the power unit 47 or stop outputting the sleep start signal.

The control unit 54 controls the feeding mechanism 20, four inkjet heads 2 (only one inkjet 2 being shown in FIG. 3 for brevity), the data transmitting unit 53, and the sleep unit 55.

The control unit 54 pauses until the authentication judging unit 61 judges that the user-input authentication information contains the predetermined information if the authentication judging unit judges that the received print command represents the secure printing. Thereafter, when the user inputs the authentication information through the operation unit 61, if the authentication judging unit 51 judges that the input authentication information contains the predetermined information, the control unit 54 controls the feeding mechanism 20 such that the printing sheet P is fed at a predetermined feeding speed, and further, drives the inkjet heads 2 by transmitting the drive data stored in the image processing work memory 46 so that the image data subject to the secure printing is printed on the printing sheet P. Further, the control unit 54 deletes the drive data stored in the image processing work memory 46 and the image data stored in the main memory 43 when in response to completion of printing on the printing sheet P.

If the authentication judging unit 51 judges that the received print command is for the normal printing, the control unit 54 controls the feeding mechanism 20 so that the printing sheet P is fed at the normal feeding speed. The control unit 54 further transmits the drive data stored in the image processing work memory 46 to the inkjet heads 2 and drives the inkjet heads 2 in accordance with the drive data.

Figure 4:
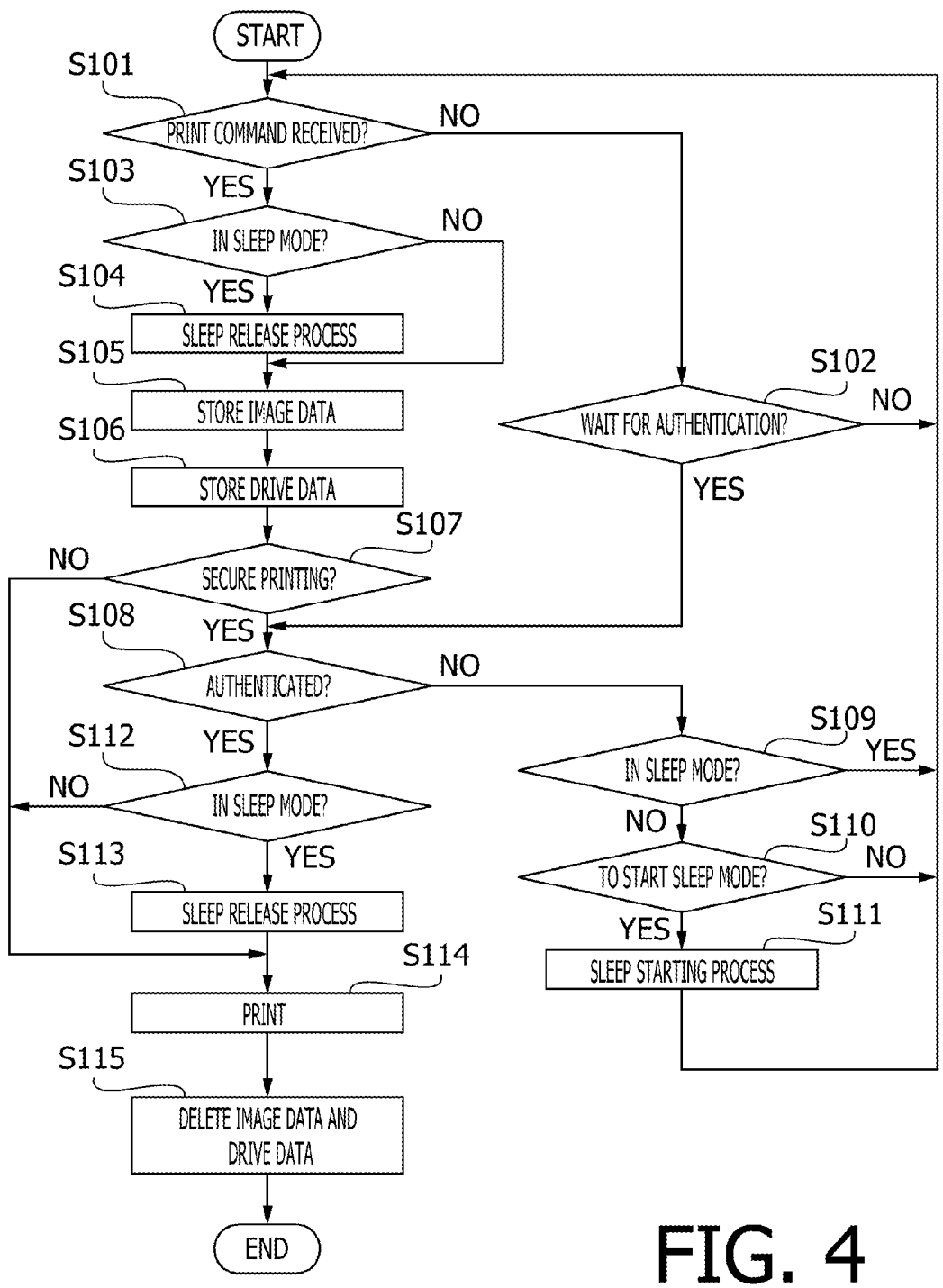
FIG. 4 is a flowchart illustrating a print process of the inkjet printer according to the embodiment of the invention.

Next, a printing process (see FIG. 4) executed by the inkjet printer 1 will be described.

Firstly, the process judges whether the receiving unit 41 has received the print command transmitted from the client terminal 71 (S101). If the receiving unit 41 has not received the print command (S101: NO), the process judges whether the process is awaiting user input of the authentication information corresponding to the previously received print command (S102). If the process is not awaiting the user input of the authentication information regarding the previously input print command (S102: NO), the process returns to S101 to judge whether a print command is received. If the process is awaiting the user input of the authentication information (S102: YES), the process proceeds to S108, where the authentication judging unit 51 judges whether the authentication information has been input through the operation panel 61 (S108).

If the receiving unit 41 has received the print command (S101: YES), image data contained in the received print data is stored in the main memory 43. Further, the control judges whether the sleep unit 55 operates in the sleep mode (S103). If the sleep unit 55 operates in the sleep mode (S103: YES), the sleep unit 55 starts a releasing process to release the sleep mode. Further, the sleep unit 55 starts a sleep mode cancellation process in which the process stops the sleep mode, that is, the process transmits a "sleep end signal" to the power unit 47, or stop outputting the sleep start signal. With the above process, the power unit 47 re-starts supplying the power to the image processing CPU 45 and the image processing work memory 46 (S104). Thereafter, the control unit 54 controls the data transmitting unit 53 such that the image data stored in the main memory 43 is stored in the image processing work memory 46 (S105). If the mode is not the sleep mode (S103: NO), the control unit 54 controls the data transmitting unit 53 that the image data stored in the main memory 53 is stored in the image data processing work memory 46 without releasing the sleep mode (S105).

The image processing CPU 45 converts the image data stored in the image processing work memory 46 into the drive data. The drive data thus converted is stored in the image processing work memory 46 (S106).

The process then judges whether the print command received by the authentication judging unit 51 represent the secure printing or not (S107). If the received print command represents the normal printing (S107: NO), the control unit 54 controls the feeding mechanism 20 to feed the printing sheet P at a predetermined feeding speed. At the same time, the control unit 54 transmits the drive data stored in the image processing work memory 46 to respective inkjet heads 2 so that the inkjet heads 2 are driven (S114) in accordance with the drive data and the image subjected to the normal print is printed on the printing sheet P.

If the received print command represents the secure print (S107: YES), the authentication judging unit 51 judges whether the user has input the authentication information through the operation panel 61 (S108). If the authentication information has not been input (S108: NO), the control judges whether the sleep unit 55 operates in the sleep mode (S109). If the sleep unit 55 operates in the sleep mode (S109: YES), the process judges wither the receiving unit 41 has received the print command (S101). If the sleep unit 55 is not in the sleep mode (S109: NO), the control judges whether the sleep mode is to be started based on whether a predetermined period has started since printing, user's operation of the inkjet printer 1, and data transmission were last executed (S110). If the sleep unit 55 does not start the sleep mode (S110: NO), the control returns to S101 to judge whether the receiving unit 41 has received a print command.

If the secure printing is designated and the authentication information has been input (S108: YES), the process judges whether the sleep unit 55 operates in the sleep mode (S112). If the sleep unit 55 does not operate in the sleep mode (112: NO), the control unit 54 controls the feeding mechanism 20 so that the printing sheet P is fed at the predetermined feeding speed, and drives the inkjet heads 2 in accordance with the drive data stored in the image processing work memory 46 (S114).

If the sleep unit 55 operates in the sleep mode (i.e., outputs the sleep start signal) (S112: YES), the process starts a sleep release process. At this stage, the control unit 54 controls the data transmitting unit 53 such that the image data stored in the main memory 43 is transmitted to the image data stored in the image processing work memory 46. Further, the image processing CPU 45 converts the image data stored in the image processing work memory 46 to the drive data (S113). Then, the control unit 54 controls the feeding mechanism 20 so that the printing sheet P is fed at the predetermined feeding speed. Further, the control unit 113. The control unit 54 also drives the inkjet heads 2 in accordance with the drive data stored in the image processing work memory 46 so that the image subjected to the secure printing is printed on the printing sheet P (S114). After the image is printed on the printing sheet P, the control unit 54 deletes the drive data stored in the image processing work memory 46 and the image data stored in the main memory 43 (S115).

As above, with the inkjet printer 1 according to the embodiment, even though the drive data stored in the image processing work memory 46 is deleted as the power supply to the image processing CPU 45 and the image processing work memory 46 is restricted if the sleep mode is started before the user's authentication regarding the secure print is performed, the image data is retained in the main memory 43. Therefore, when the sleep mode is released, it is possible to restore the drive data based on the image data stored in the main memory 43, and the printing process can be executed based on the restored drive data. Therefore, according to the embodiment, power saving is realized with maintaining the high security.

According to the embodiment, after the sleep mode is released, the image data is transmitted from the main memory 43 to the image processing work memory 46, the printing operation can be done without having the main CPU 42 operate during such operation, and the printing operation can be done efficiently.

According to the embodiment, the sleep mode starts after a predetermined period has elapsed since the printing, user's operation to the inkjet printer 1 and data transmission are finally performed. Therefore, the power saving function is implemented efficiently.

According to the embodiment, the image data is stored in the main memory 43 and the drive data, which has been converted from the image data, is stored in the image processing work memory 46, it is unnecessary to convert the image data to the drive data after the authentication is done, and the printing operation can be started quickly. Further, since the image data, which is smaller in size, is stored in the main memory 43, the capacity of the main memory 43 can be smaller in comparison with the image processing work memory 45.

Further, since the main memory 43 is a volatile memory, the image data stored in the main memory 43 is deleted when the inkjet printer 1 is powered OFF. With this configuration, the security regarding the print data can be improved.

In addition, the image data stored in the main memory 43 is not deleted until printing operation to print the image on the printing sheet P is completed. Therefore, even though a paper jam or the like occurs and the printing operation is interrupted, the printing operation can be re-executed.

According to the embodiment, the drive data stored in the image processing work memory 46 and the image data stored in the main memory 43 are deleted when the printing operation has been completed. Therefore, capacity of each memory can be retained, and leakage of the data can be prevented.

If the sleep mode is started, the power supply to the image processing CPU 45 and the image processing work memory 46 is completed stopped, it is ensured that power save can be realized.

The invention is described referring to the exemplary embodiment. It is noted that the invention does not need to be limited to the configuration of the above-described exemplary embodiment, but can be modified in various ways without departing from the scopes of the invention.

According to the embodiment, the image data stored in the main memory 43 is transmitted to the image processing work memory 46 after the sleep mode is released. It may be modified such that the drive data is transferred to the main memory 43 when the sleep mode is started, and the drive data is transferred to the image processing work memory 46 when the sleep mode is released. With such a configuration, it becomes unnecessary to convert the image data to the drive data when the sleep mode is terminated, and the printing operation can be restarted quickly since it is unnecessary to convert the image data to the drive data.

Alternatively, the inkjet printer 1 may be configured such that the image data is not stored in the image processing work memory 46 after the sleep mode is released. In such a case, the control unit 54 converts the image data stored in the main memory 43 to the drive data, and based on which the control unit 54 drives the inkjet heads 2.

According to the embodiment, the image processing CPU 45 converts the image data to the drive data before the authentication with respect to the print data received by the receiving unit 41 is performed. This configuration may be modified such that the conversion is done after the authentication is executed. If the image data is described using a PDL (page description language), the amount of data stored in the memory can be reduced.

According to the above embodiment, the sleep mode is started when a predetermined period has elapsed after printing, user operation to the inkjet printer 1 and data transmission are finally executed. Optionally or alternatively, the sleep mode may start when another condition is satisfied.

According to the embodiment, the main memory is a volatile memory. However, the main memory may be a non-volatile memory.

According to the embodiment, the image data stored in the main memory and the drive data stored in the image processing work memory 46 are deleted when the printing on the printing sheet P is completed. The configuration may be modified such that the image data stored in the main memory 43 may be deleted when the sleep mode is released. Alternatively, the image data may not be deleted as long as the main memory 43 has a sufficient capacity. Similarly, the drive data stored in the image processing work memory 46 may be retained, even after completion of printing, as far as the image processing work memory 46 has a sufficient capacity.

According to the embodiment, the power supply to the image processing CPU 45 and the image processing work memory 46 is completely shut off when the sleep mode is started. This configuration may be modified such that the power supply to only one of the image processing CPU 45 and the image processing work memory 46 is shut off. Alternatively, the power supply to at least one of the image processing CPU 45 and the image processing work memory 46 may be restricted but not shut off. For example, the image processing CPU 45 has a sleep function which allows a part of its function unit to operate. For example, the sleep function may be a function in which a refresh operation of the image processing work memory 46 is stopped and the operation of the image processing CPU 45 is stopped. In such a case, the image processing CPU 45 operates in a low power consumption mode in which the image processing CPU 45 only monitors input of a mode release interruption signal. According to such a configuration, the sleep mode can be released quickly in comparison with a case where the power is completed shut off.

In addition, the receiving unit 41 receives the image data (print command) via the LAN 3. This configuration may be modified such that the receiving unit 41 may receive image data which is directly input to the inkjet printer via a memory card reader or the like directly connected to the inkjet printer 1.

It is noted that a main processing section including the main CPU 42 and the main memory 43, and an image processing section including the image processing CPU 45 and the image processing work memory 46 may be arranged on different substrates, or the same substrate.

The present invention may be applied to a device which is configured to eject liquid other than the ink. Further, the invention may be applied to a laser beam printer. Furthermore, the invention can be applied to any image forming devices such as a facsimile device, a copying device and the like.

What is claimed is:

1. An image recording device, comprising:
   an image recording unit configured to print an image on a printing sheet;
   a first memory configured to be a volatile memory;
   a second memory;
   a receiving unit configured to receive image data which is externally transmitted, the image data being stored in the second memory, authentication being required in order to execute printing based on the image data;
   a converting unit configured to convert the image data to drive data used to drive the image recording unit, the drive data being stored in the first memory;
   an authentication judging unit configured to judge whether authentication is performed;
   a restricting unit configured to restrict power supply to the converting unit and the first memory at a predetermined timing, wherein when a power supply to the first memory is restricted by the restricting unit, data stored in the first memory is deleted;
   and
   a control unit, wherein when the authentication judging unit judges that the authentication is performed after the restricting unit starts restricting the power supply to the converting unit and the first memory, the control unit is configured to:
   start supplying the power supply to the converting unit and the first memory;
   control the converting unit to generate the drive data based on the image data stored in the second memory, the drive data being stored in the first memory; and
   control the image recording unit to print the image on the printing sheet based on the drive data stored in the first memory.

2. The image recording device according to claim 1, further comprising:
   a transmitting unit configured to transmit the image data between the first memory and the second memory, wherein the control unit is configured to control the transmitting unit such that the image data is transmitted from the second memory to the first memory in response to restriction regarding power supply by the restriction unit has been released.

3. The image recording device according to claim 1, wherein the predetermined timing is when a time period in which none of printing by the recording unit, receipt of data by the receiving unit and input to an input unit is executed exceeds a predetermined period and wherein the control unit is configured to control the restriction unit to start restricting the power supply at the predetermined timing.

4. The image recording device according to claim 1, wherein the second memory is a volatile memory.

5. The image recording device according to claim 1, wherein the control unit does not delete the image data stored in the second memory until printing of the image executed by the image recording unit is completed.

6. The image recording device according to claim 5, wherein the control unit deletes the image data or the drive data stored in the first memory and the second memory in response to the printing of the image executed by the image recording unit has been completed.

7. The image recording device according to claim 1, wherein the control unit completely shuts out the power supply to at least one of the converting unit and the first memory.

8. A non-transitory computer accessible storage storing a program containing computer executable instructions, when executed, to control an image recording device,
   the image recording device is provided with:
   an image recording unit configured to print an image on a printing sheet,
   a first memory configured to be a volatile memory;
   a second memory;
   a receiving unit configured to receive image data which is externally transmitted, the image data being stored in the second memory, authentication being required in order to execute printing based on the image data;
   a converting unit configured to convert the image data to drive data used to drive the image recording unit, the drive data being stored in the first memory;
   an authentication judging unit configured to judge whether authentication is performed;
   a restricting unit configured to restrict power supply to the converting unit and the first memory at a predetermined timing, wherein when a power supply to the first memory is restricted by the restricting unit, data stored in the first memory is deleted; and wherein when the authentication judging unit judges that the authentication is performed after the restricting unit starts restricting the power supply to the converting unit and the first memory, the instructions cause a computer to:

start supplying the power supply to the converting unit and the first memory;

control the converting unit to generate the drive data based on the image data stored in the second memory, the drive data being stored in the first memory; and control the image recording unit to print the image on the printing sheet based on the drive data stored in the first memory.

9. The non-transitory computer accessible storage according to claim 8, wherein the image recording device further comprises a transmitting unit configured to transmit the image data between the first memory and the second memory, wherein the instructions cause the computer to control the transmitting unit such that the image data is transmitted from the second memory to the first memory in response to restriction regarding power supply by the restriction unit has been released.

10. The non-transitory computer accessible storage according to claim 8, wherein the predetermined timing is when a time period in which none of printing by the recording unit, receipt of data by the receiving unit and input to an input unit is executed exceeds a predetermined period and wherein the instructions cause the computer to control the restriction unit to start restricting the power supply at the predetermined timing.

11. The non-transitory computer accessible storage according to claim 1, wherein the second memory is a volatile memory.

12. The non-transitory computer accessible storage according to claim 8, wherein the instructions cause the computer not to delete the image data stored in the second memory until printing of the image executed by the image recording unit is completed.

13. The non-transitory computer accessible storage according to claim 12, wherein the instructions cause the computer to delete the image data or the drive data stored in the first memory and the second memory in response to the printing of the image executed by the image recording unit has been completed.

14. The non-transitory computer accessible storage according to claim 8, wherein the instructions cause the computer to completely shuts out the power supply to at least one of the converting unit and the first memory.

15. An image recording device, comprising:
an image recording unit configured to print an image on a printing sheet;
a receiving unit configured to receive image data which is transmitted from an external device to the image recording device, authentication being required in order to execute printing based on the image data;
a main memory configured to store the image data received by the receiving unit;
a work memory configured to be a volatile memory;
a converting unit configured to convert the image data to drive data which is used to drive the image recording unit, the drive data being stored in the work memory;
an authentication judging unit configured to judge whether authentication is performed;
a restricting unit configured to restrict power supply at least to the work memory if a predetermined condition is satisfied, wherein when the power supply to the work memory is restricted by the restricting unit, data stored in the work memory is deleted; and
a print control unit configured to, when the authentication judging unit judges that the authentication is performed after the restricting unit starts restricting the power supply to at least the work memory,
start supplying the power supply to at least the work memory;
control the converting unit to generate the drive data based on the image data stored in the main memory, the drive data being stored in the work memory; and
control the image recording unit to print the image on the printing sheet based on the drive data stored in the work memory.

16. The image recording device, according to claim 15, wherein the restricting unit further restricts power supply to the converting unit if the predetermined condition is satisfied.

17. The image recording device according to claim 15, wherein the main memory is a volatile memory, and
wherein the restricting unit maintains power supply at least to the main memory if the recording unit has not printed the image corresponding to the image data stored in the main memory.

18. The image recording device according to claim 15, further comprising:
a data transmitting unit configured to transmit the image data from the main memory to the work memory.

19. The image recording device according to claim 1, wherein, when the authentication judging unit judges that the authentication is performed before the restricting unit starts restricting the power supply to the converting unit and the first memory, the control unit is configured to control the image recording unit to print the image on the printing sheet based on the drive data stored in the first memory without controlling the converting unit to convert the image data to the drive data.

20. The non-transitory computer accessible storage according to claim 8, wherein, when the authentication judging unit judges that the authentication is performed before the restricting unit starts restricting the power supply to the converting unit and the first memory, the instructions cause the computer to control the image recording unit to print the image on the printing sheet based on the drive data stored in the first memory without controlling the converting unit to convert the image data to the drive data.

21. The image recording device, according to claim 15, wherein, when the authentication judging unit judges that the authentication is performed before the restricting unit starts restricting the power supply to at least the work memory, the print control unit is configured to control the image recording unit to print the image on the printing sheet based on the drive data stored in the work memory without controlling the converting unit to convert the image data to the drive data.

* * * * *